Nov. 20, 1934.   R. O. WERTZ   1,981,259
MOTOR CONTROL SYSTEM
Filed Feb. 12, 1932
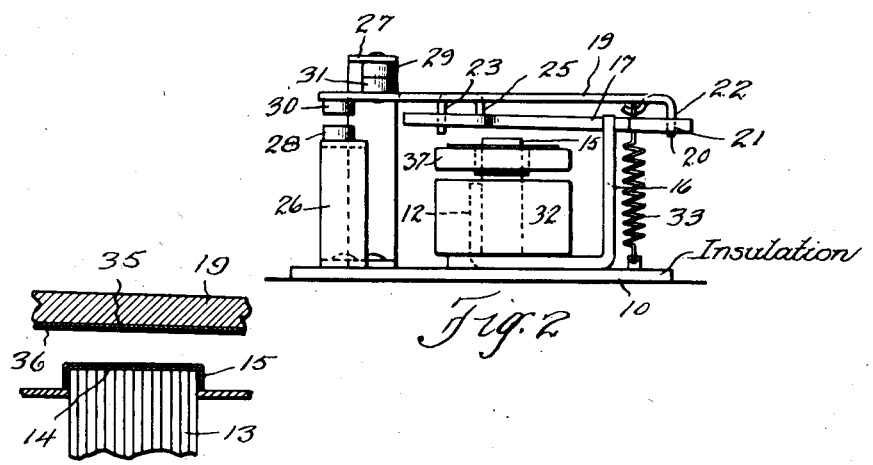
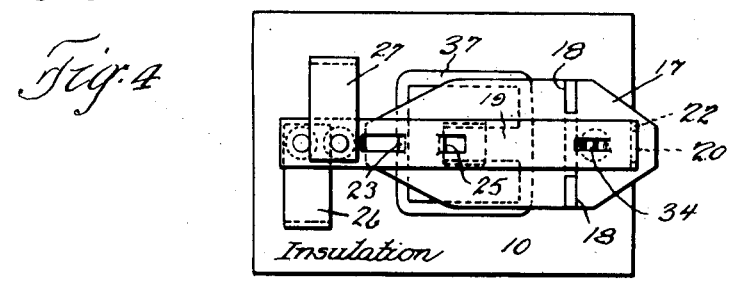
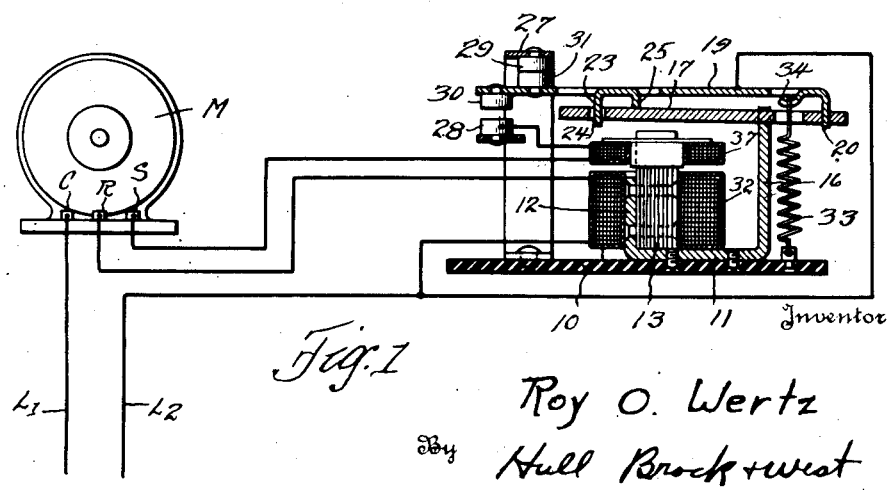
Inventor
Roy O. Wertz
By Hull Brock + West
Attorney Patented Nov. 20, 1934

1,981,259

UNITED STATES PATENT OFFICE 1,981,259

MOTOR CONTROL SYSTEM

Roy O. Wertz, Cleveland Heights, Ohio, assignor to The Ohio Electric Mfg. Company, Cleveland, Ohio, a corporation of Ohio Application February 12, 1932, Serial No. 592,627

3 Claims. (Cl. 200—87)

This invention relates to a starting control system for an alternating current motor of the single phase type having running and starting windings.

The principal object of the invention is to provide a system by which when current is supplied to the motor as by the closing of a switch, the starting winding will be automatically connected in circuit and will remain there until the motor comes up to speed whereupon it will be automatically disconnected. A further object is to provide a novel relay for cooperation with the motor and the necessary connections for accomplishing the above mentioned results.

A further object is to provide a means for counteracting the effect of residual magnetism in the relay core. A still further object is to provide for a "hammer break" when th relay operates to open the starting-winding circuit.

I attain the foregoing and other and more limited objects in and through the disclosure hereinafter described and claimed in the accompanying drawing in which Fig. 1 is a diagrammatic view showing the relay in section and, diagrammatically, the connections to the motors; Fig. 2 is a side elevation of the relay alone; Fig. 3 is a plan view thereof; and Fig. 4 is an enlarged, fragmentary, detail section showing the plating which I employ for forming a gap in the magnetic circuit.

Referring now to the accompanying drawing, I shall describe the relay in detail after which its relation to the system will be set forth.

The elements constituting the relay may be made upon any suitable base 10 or its equivalent. Secured to the base 10 is a U-shaped member 11 composed of magnetic material, preferably iron. Secured to the shorter upstanding end 12 of the member 11 is a relay core 13, the upper end of which may be plated with a thin layer of copper 14 overlaid by a thinner plating of chromium 15. The other end 16 of the U-shaped member 11 is provided with a central notch which may be approximately one-half its width as indicated in the drawing. Resting in the notch in the portion 16 is a lower armature member 17 provided with opposed notches 18 near the right hand end thereof as seen in the drawing receiving the terminal projections of the portion 16 sufficiently loosely as to allow a small pivotal movement of such member with respect to the portion 16. Pivoted above the lower armature member 17 is an upper armature member 19 having a tongue 20 received in an opening 21 in the extreme right hand end of the lower member 17. The tongue 20 is defined by shoulders 22 on the member 19 which engage the upper surface of the member 17. A guide tongue 23 is struck out of the member 19 and projects through an opening 24 in the member 17. A spacing tongue 25 is also struck out of the member 19 and is adapted to engage the upper surface of the member 17. Upstanding from the base 10 are members 26 and 27 which carry contact points 28 and 29, adapted to limit the movement of the member 19 and to serve as switch elements.

The base 10 is composed of insulating material while the members 26 and 27 are composed of conducting material. In the embodiment disclosed, the switch point 29 merely serves as a stop although it may be used to make a contact if desired. Contacts 30 and 31 carried by a member 19 cooperate with the points 28 and 29. The upper portion of the relay core 13 is adapted to form a stop for the lower armature member 17 and is positioned at such a distance from the latter member in the open position that when the coil 32 is energized, the member 17 will move a material distance after the contact 28 arrests the motion of the member 19. A spring 33 is connected between the base 10 and a tongue 34 struck out of the member 19. By the arrangement described, the two armature members are caused to move as a unit from open position to the point at which the stop 30 engages the point 28, after which the lower member 17 will continue to move until it engages the upper end of the coil 13. The member 17 may consist of a plurality of laminations coated by depositing thereon consecutive layers 35 and 36 of copper or other non-magnetic material and chromium. The chromium gives it a hard surface which will resist wear while the copper or equivalent plating provides a spacing of non-magnetic material whereby to interrupt the magnetic circuit. I prefer to coat both the lower surface of the member 17 and the upper end of the member 13, although fairly satisfactory results may be obtained by coating only one of them. An auxiliary relay coil 37 may be carried by the core 13 and wound or connected in such a way that the magnetic flux set up thereby when the starting-winding is energized will oppose that set up by the coil 32 and tend to neutralize the residual magnetism induced by the coil 32 in the core 13.

In Fig. 1 I have shown the relation of the relay to the motor in an illustrative embodiment. The motor M is provided with binding posts C, R and S. The binding post R is connected with one terminal of the running winding; that S is connected with one terminal of the starting-winding, and that C with the other terminals of both said windings. The line L is connected with the binding post C. The line L² is connected in series with the coil 32 to the binding post R, also to the armature of the relay. The relay contact 28 is connected through the auxiliary coil 37 to the binding post S.

It will thus be seen that when current is supplied through the conductors L and L², it flows through the running winding of the motor and the coil 32 in series. This current will be sufficient when the motor is at rest to close the relay against the action of the spring 33. This will result in the establishment of a circuit from the line L² through the armature auxiliary winding 37 and starting winding of the motor in series. As soon as this contact is established, the motor will start and when it comes up to speed, the current will be reduced to such an extent that the spring 33 will open the relay against the action of the coil 32 thereby cutting out the starting winding.

I have found in practice that with an ordinary relay, great difficulty is incurred in getting the same to open when the motor comes up to speed. I attribute this to the holding power of residual magnetism in the core 13. I have disclosed two means of combating this difficulty; one, the use of an auxiliary relay coil in series with the starting winding and wound in such a direction as to oppose residual magnetism induced by the coil 32; and second, the provision of an interruption of the magnetic circuit through the members 13, 16 and 17 by the interposition of a plating of non-magnetic material on one or both of the members 13 and 17. It will be desirable to use both these means in the same relay, although either can be used successfully alone. The plating where chromium is employed as the outer layer has the additional advantage of preventing wear of the contacting parts.

From the foregoing, it will be obvious that I have provided an automatic starting-winding control which is well adapted for its intended purpose and, while I have shown and described the present preferred embodiment, I wish it understood that I am not limited to the details thereof except in accordance with the appended claims and the prior art.

Having thus described my invention, what I claim is:

1. A relay including a core, a coil on said core, an upstanding magnetic member spaced from said coil and magnetically connected with said core, a lower armature member composed of magnetic material pivoted on said upstanding member and adapted to engage said core, an upper armature member pivoted to said last mentioned member at a point more remote from said coil than said upstanding member, provided with a stop adapted to engage said lower armature member on the opposite side of said upstanding member from its pivot point, said upper armature member carrying switch points, and spring means connected to said upper armature member between its pivot point and that of the upstanding member whereby to allow it to move with the lower armature member through a portion of the throw of the latter and to allow separation of the armature members through the remaining portion of such throw.

2. A relay including a core, a coil on said core, an armature pivoted in operative relation to said core and carrying a switch point, a second switch point cooperating with the first switch point, and spring means tending to hold said armature in normal biased position, said armature comprising a pair of relatively movable members, said spring means tending to cause said members to move together in both directions, means for arresting motion of one of said members, and said second switch point constituting a stop to arrest the motion of the other of said members prior to the arrest of the first, the lower of said members being biased more than the upper.

3. As a sub-combination in a relay, an armature comprising a pair of relatively movable members and a single spring means tending to prevent relative motion thereof in one direction and serving to bias said armature.

ROY O. WERTZ.